(12) United States Patent
Sadja et al.

(10) Patent No.: US 8,209,678 B2
(45) Date of Patent: Jun. 26, 2012

(54) SYSTEM, APPARATUS, AND METHOD FOR AN UPGRADER MODULE

(75) Inventors: Aran Sadja, San Diego, CA (US); Eric Holcomb, San Marcos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1133 days.

(21) Appl. No.: 11/856,400

(22) Filed: Sep. 17, 2007

(65) Prior Publication Data

US 2009/0077549 A1    Mar. 19, 2009

(51) Int. Cl.
*G06F 9/44* (2006.01)
(52) U.S. Cl. .................................................. 717/172
(58) Field of Classification Search ............... 717/172
See application file for complete search history.

(56) References Cited

U.S. PATENT DOCUMENTS

| | | | |
|---|---|---|---|
| 5,564,108 A | 10/1996 | Hunsaker et al. | |
| 5,666,501 A * | 9/1997 | Jones et al. | 715/748 |
| 5,837,986 A | 11/1998 | Barile et al. | |
| 6,041,183 A * | 3/2000 | Hayafune et al. | 717/173 |
| 6,640,334 B1 * | 10/2003 | Rasmussen | 717/171 |
| 6,687,901 B1 * | 2/2004 | Imamatsu | 717/173 |
| 6,732,195 B1 | 5/2004 | Baldwin | |
| 6,904,592 B1 | 6/2005 | Johnson | |
| 7,130,896 B2 * | 10/2006 | Engel et al. | 709/220 |
| 7,676,804 B2 * | 3/2010 | Ferguson et al. | 717/168 |
| 7,770,165 B2 * | 8/2010 | Olson et al. | 717/168 |
| 7,802,092 B1 * | 9/2010 | Kelly et al. | 713/156 |
| 7,883,417 B2 * | 2/2011 | Bruzzese et al. | 463/39 |
| 7,904,608 B2 * | 3/2011 | Price | 710/11 |
| 8,060,874 B2 * | 11/2011 | Rengarajan et al. | 717/177 |
| 2004/0068721 A1 * | 4/2004 | O'Neill et al. | 717/168 |
| 2005/0086322 A1 | 4/2005 | Park | |
| 2005/0097541 A1 | 5/2005 | Holland | |
| 2005/0102584 A1 | 5/2005 | Paturi et al. | |
| 2006/0106806 A1 * | 5/2006 | Sperling et al. | 707/10 |
| 2008/0005733 A1 * | 1/2008 | Ramachandran et al. | 717/168 |
| 2008/0052698 A1 * | 2/2008 | Olson et al. | 717/168 |
| 2009/0037284 A1 * | 2/2009 | Lewis et al. | 705/16 |

FOREIGN PATENT DOCUMENTS

WO    WO2004097711    11/2004

* cited by examiner

*Primary Examiner* — Wei Zhen
*Assistant Examiner* — Kevin Dothager
(74) *Attorney, Agent, or Firm* — Blakely, Sokoloff, Taylor & Zafman LLP

(57) ABSTRACT

A method and apparatus for obtaining and installing software updates on consumer electronics devices is described. In one embodiment, the method may include obtaining a software update for a consumer electronics (CE) device and a communications protocol for installing the software update on the CE device. The method may also include a portable device installing the software update on the CE device utilizing the communications protocol, in response to the portable device detecting a communications link between the portable device and the CE device.

20 Claims, 8 Drawing Sheets

SYSTEM, APPARATUS, AND METHOD FOR AN UPGRADER MODULE

FIELD

The present invention relates to the field of portable electronic devices; more particularly, the present invention relates to a portable upgrader module for installing software updates on various consumer electronics devices.

BACKGROUND OF THE INVENTION

Electronic devices are becoming ubiquitous in modern society. Digital music players, electronic televisions, portable digital video disc (DVD) players, desktop computer systems, etc. are commonplace, software-controlled systems, that are in use every day. Furthermore, devices that were previously and primarily mechanically controlled systems, such as refrigerators, dishwashers, etc., are more frequently being controlled by software executed on a microprocessor. Software, however, is often subject to bugs. These errors, flaws, or mistakes in a software program may prevent the program from working correctly, or cause the software program to produce an incorrect or non-optimal result.

Delivering a software patch to a computer system, or a portable device which may easily be connected to a computer system, may be a simple task. However, a problem arises with current consumer electronics devices, such as televisions, car stereos, refrigerators, etc., which have limited to no portability. Such consumer electronic devices often are controlled by proprietary software, lack a simple way of delivering an upgrade (e.g., upgrading a personal computer program is usually achieved by downloading a patch over the internet and having the patch automatically installed by the personal computer), and software systems in consumer electronics devices are usually inaccessible to end users. Furthermore, such devices are less portable and therefore are less likely to receive upgrades, patches, and new software functionality.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
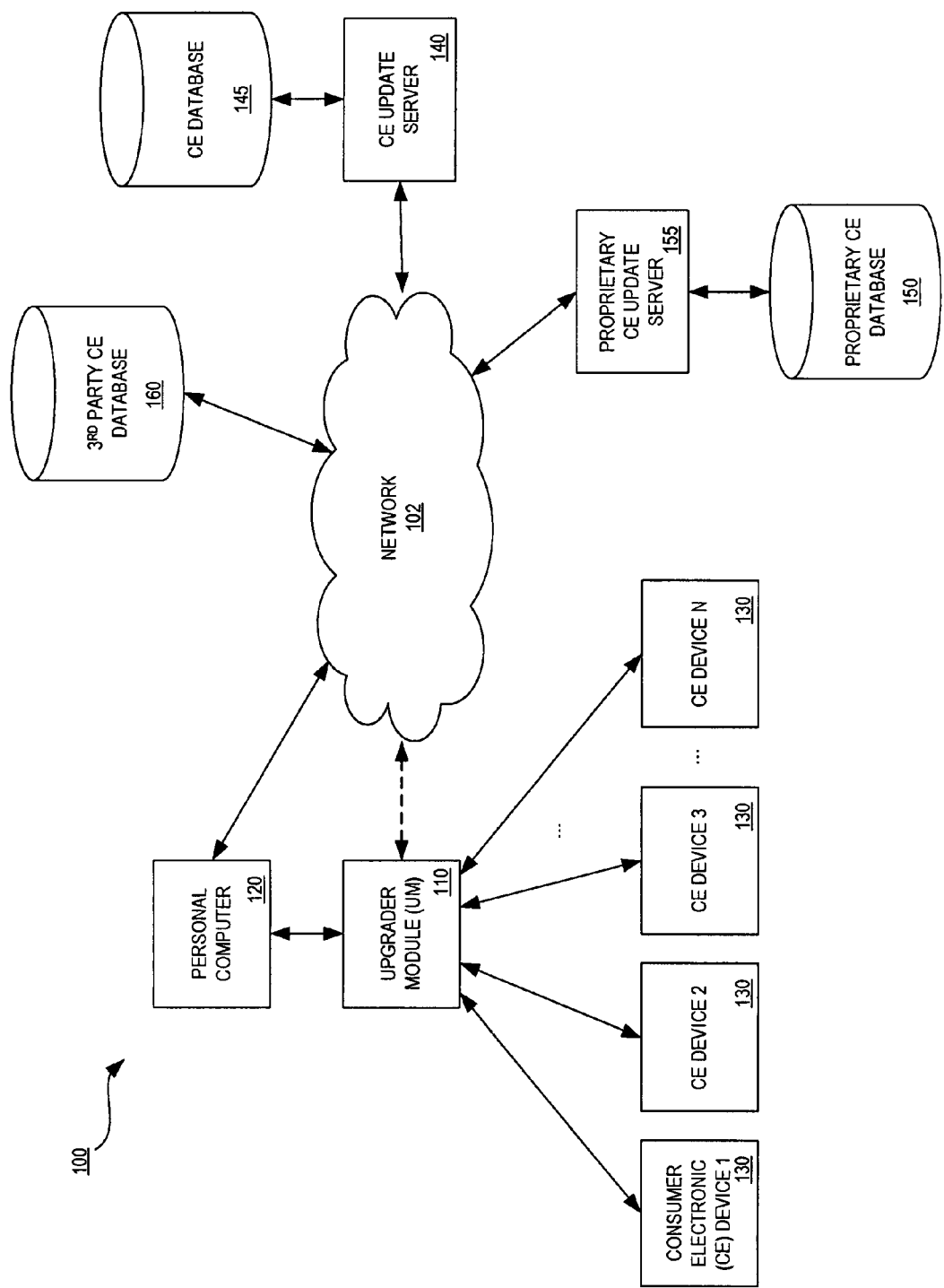
FIG. 1 illustrates one embodiment of an architecture in which embodiments of the present invention may operate.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A method and apparatus for obtaining and installing software updates on consumer electronics devices is described. In one embodiment, a software update for a consumer electronics (CE) device and a communications protocol for installing the software update are obtained. A portable device installs the software update on the CE device utilizing the communications protocol when the portable device detects the establishment of a communications link between the portable device and the CE device. In one embodiment, the CE devices include devices such as car stereos, refrigerators, television sets, etc. which are not highly portable and thus are less likely to receive software updates via conventional personal computer connectivity. Furthermore, the obtained protocol is utilized to complete the software update installation because device manufacturers often utilize proprietary communications protocols for the installation of updates.

In one embodiment, a CE device is queried for at least identification data and a current software version operating on the CE device. The software version and CE device identification data are then stored in a memory of the portable device. To facilitate a portable device providing updates to numerous CE devices, a database is maintained for the numerous CE devices, which stores the CE device identification data and a corresponding software version operating on each CE device. A periodic check for update availability is made for each CE device in the database, and the updates are downloaded from an update server over a communications network when an update is available.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer systems registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 illustrates one embodiment of an architecture in which embodiments of the present invention may operate. In one embodiment, the architecture 100 includes an upgrader module (UM) 110 coupled to a personal computer (PC) 120, which is in turn coupled with a communications network 102 such as a public network (e.g., the Internet, a wireless network, etc.), a private network (e.g., LAN, Intranet, etc.), or a combination of networks. In another embodiment, UM 110 is directly coupled with network 102. UM 110 may communicate with PC 120 and/or network 102 via a universal serial bus (USB) connection, a wireless fidelity (Wi-Fi) connection, an integrated services digital network (ISDN) connection, etc. In one embodiment, UM 110 may be a dedicated portable or handheld device, however, the techniques described herein may also be utilized in portable systems such as personal digital assistants, web enabled cellular telephones, laptop computer systems etc.

In either embodiment, UM 110 communicate with multiple consumer electronic (CE) devices, CE device 1 to CE device N 130, via a USB connection, Wi-Fi connection, etc. CE devices 1 through N 130 may be a collection of CE devices including digital television sets, electronically controlled refrigerators, dishwashers, portable digital music players, car stereos, etc. Any device that is controlled by software may be included as a CE device, as is discussed herein.

UM 110 and/or PC 120 communicate over network 102 with CE update server 140. In one embodiment, CE update server hosts CE database 145, which stores updates for various CE devices. As is discussed herein, an update may refer to one or both of a software upgrade (e.g., addition of a new feature, optimization, etc.) or a software patch (e.g., a bug fix, an error correction, a fault correction, etc.). When UM 110 or PC 120 initiates a request for an update over network 102, CE update server 140 receives the request and queries CE database 145 to determine if an update exists for the request. In one embodiment, if the update exists, CE server 140 transmits the update, along with a communications protocol for installing the update on a particular CE device 130, over network to personal computer 120. When PC 120 and UM 110 are coupled to each other, PC 120 transmits the update to UM 110, which in turn stores the update in an internal memory. In another embodiment, CE server 140 transmits the update directly to UM 110 via network 102.

In one embodiment CE update server 140 hosts a universal database of CE devices. However, CE update server 140 may also communicate with $3^{rd}$ party CE database 160 to obtain software updates for CE devices supplied and/or maintained by the $3^{rd}$ party. When PC 120 or UM 110 requests a software update for a CE device of a $3^{rd}$ party, CE update server 140 queries the $3^{rd}$ party CE database 160 over network 102, and supplies updates, when available, to UM 110 or PC 120 from $3^{rd}$ party CE database 160.

In one embodiment, CE update server 140 communicates with proprietary CE update server 155. A proprietary CE update server 155 may be employed by a $3^{rd}$ party that does not provide open access to their database of updates. In order for a user of PC 120 or UM 110 to receive an update from such a proprietary source, CE update server 140 redirects the request, to cause PC 120 or UM 110 to request an update directly from proprietary CE update server 155. In one embodiment, the redirection is accompanied with an identification, verification, token, etc. to indicate to proprietary CE update server 155 that the request is authorized. Similar to the discussion above, proprietary CE update server 155 queries proprietary CE database 150 for updates, if any, in response to the request. When an update is available, proprietary CE update server 155 transmits the request over network 102 to PC 120 or UM 110.

After UM 110 has received an update for one of CE devices 1 through N 130 (either by directly receiving an update from server 140 or 155, or after being coupled with PC 120), UM 110 may install the update on a CE device. In one embodiment, UM 110 activates a visual and/or audible indicator on UM 110 to inform a user that an update for a CE device is available. In one embodiment, UM 110 installs the update on a target CE device when UM 110 detects a communications link with the CE device. Because CE devices may include proprietary communications protocols, UM 110 utilizes the communications protocol received along with the update, to complete the installation on the target CE device. In one embodiment, the success or failure to install an update is indicated on a display, light emitting diode (LED), audibly, etc. of UM 110.

Because UM 110 is portable, and may store updates for any number of CE devices, UM 110 provides an easy and convenient way to bring software updates to many devices that were previously out of reach of software updates. In one embodiment, UM 110 provides software updates to a multiplicity of devices such as refrigerators, car stereos, etc. that were previously out of reach of software updates. Furthermore, because UM 110 utilizes a received protocol to install an update, UM 110 may communicate over either proprietary or open communications systems.

Figure 2:
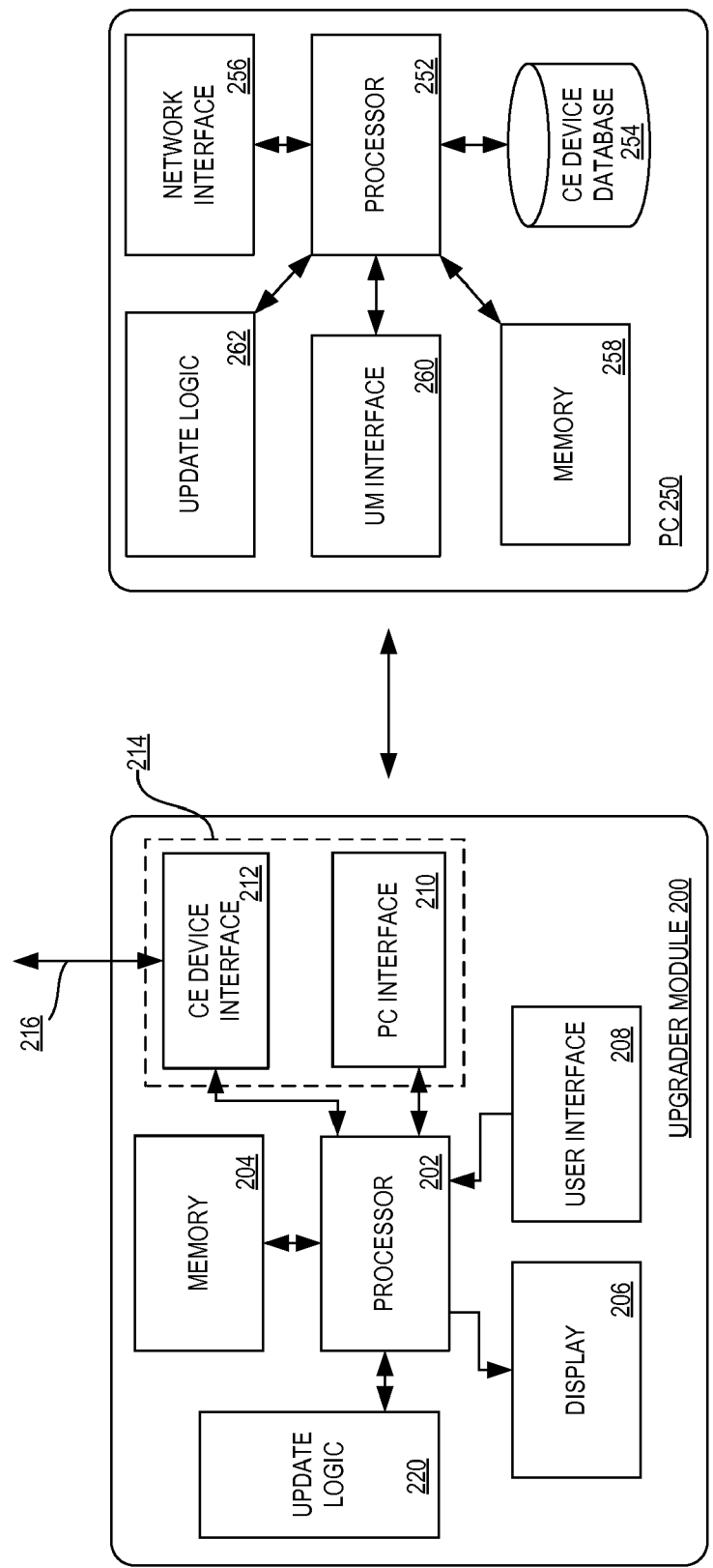
FIG. 2 is a block diagram of one embodiment of an upgrader module and a personal computer.

FIG. 2 is a block diagram of one embodiment of an upgrader module and a personal computer. The upgrader module (UM) 200 may include a processor 202, a memory 204, a display 262, a user interface 208, a consumer electronics (CE) device interface 212, a personal computer (PC) interface 210, and update logic 220. In one embodiment, CE device interface 212 and PC interface 210 are a single communication interface, as indicated by dashed box 214. The PC 250 may include a processor 252, CE device database 254, network interface 256, update logic 262, UM interface 260, and memory 258. Some components of PC 250 have been omitted from PC 250 to avoid obscuring the present invention. However, a more detailed discussion of one embodiment of a personal computer is provided below.

The user interface 208 receives user commands, which are provided to the processor 202 for executing the commands. In one embodiment, user interface may be a touch screen, a capacitive sensing device, an alpha-numeric key pad, etc. In one embodiment, received user commands may include commands to initiate update requests on PC 250, or requests to install an update on a target CE device (not shown) via communications link 216.

PC interface 210 is responsible for communicating requests and receiving responses with PC 250, and exchanging data with PC 250 based on those requests. In one embodiment, updated communications protocols for installing those updates on CE devices are pushed from PC 250 to UM 200 via PC interface 210 when PC 250 has an update and detects a communication link with UM 200.

After receiving an update from PC 250, processor 202 of UM 200 stores the update and associated communications protocol in memory 204. In one embodiment, when update logic 220 detects that CE interface 212 is communicatively coupled with a CE device, any updates for the device are automatically installed on the CE device utilizing the communications protocol. In another embodiment, update logic 220 is triggered in response to receiving a user command via user interface 208.

CE device interface 212 may be a wireless communications interface (e.g., Wi-Fi), a wired communications interface (e.g., USB, IEEE 1394 FireWire, etc.), or a combination of both. A USB interface is a common interface that supports additional communications interfaces. For example, USB-to-serial adapters, as well as other interface adapters, are widely available and, in one embodiment, provide the UM with a great deal of flexibility in connecting with various CE devices. Furthermore, USB may be utilized because it is a high speed interface which permits the efficient transfer of large amounts of data.

As updates are being installed on a CE device by UM 200, update logic 220 may cause the display of an update progress on display 262. Furthermore, upon completion of an update's installation on a CE device, update logic 220 may cause the display 262 of a notification indicating the success or failure of the attempted update installation.

In one embodiment, PC 250 obtains the updates and communications protocols for installing CE device updates from a CE update server, such as CE server 140 of FIG. 1, via network interface 256. Network interface may be a Wi-Fi network adapter, an ISDN modem, a cable modem, etc.

Because UM 200 may be utilized to update multiple CE devices, processor 252 maintains a CE device database 254. In one embodiment, CE device database 254 includes data indicating at least device identification numbers for each CE device, a current software version for each CE device, and a corresponding communications protocol if one has been received. CE device database may store additional data for CE devices, such as model number, serial number, warranty information, etc. Although CE device database 254 stores data indicating a device, software version, communications protocol, etc., software updates, and communications protocols may also be stored by PC 250 in memory 258.

In one embodiment, update logic 262 periodically queries an update server, so that PC 250 may automatically obtain the most recent software updates available for CE devices in CE device database 254. In another embodiment, update logic 262 queries an update server in response to receiving a user request to check for updates. Upon receipt of an update, update logic 262 stores the software update (and communications protocol if the protocol has changed or the received update is a first connection update) in memory 258, and updates CE device database 254 accordingly. In one embodiment, update logic 262 further stores an indication in memory 258 and/or CE device database 254 indicating that a new update has been received and is ready for transmission to UM 200.

Figure 3:
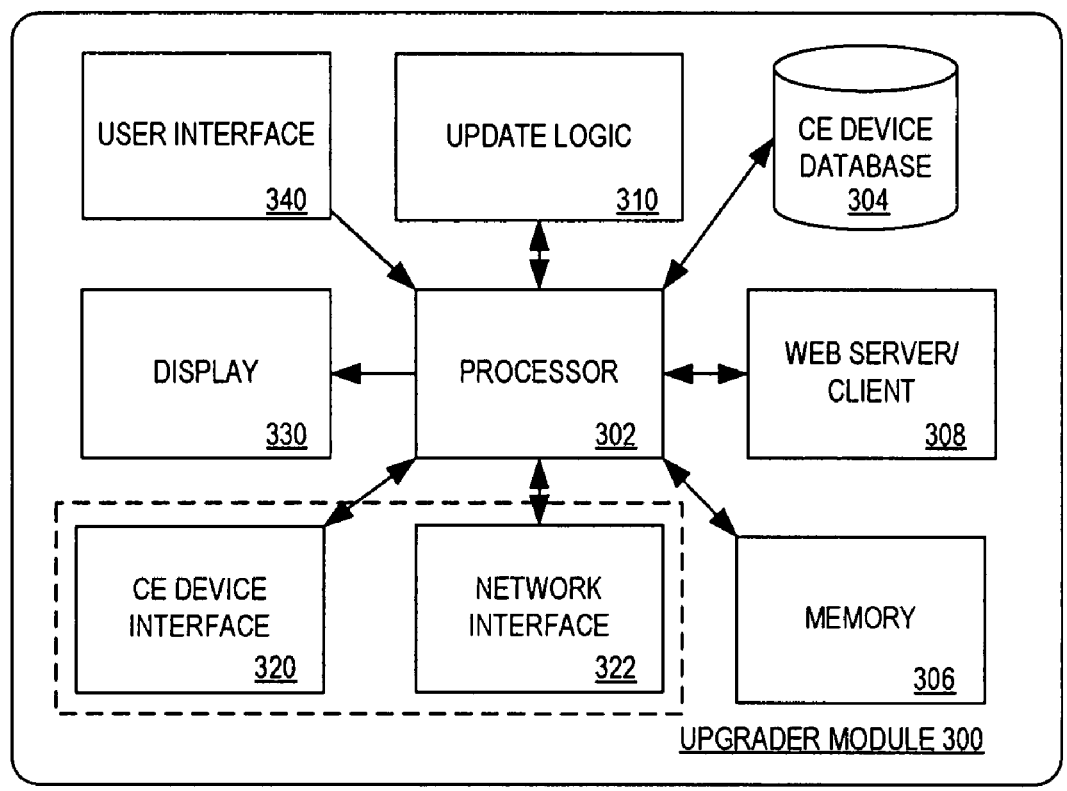
FIG. 3 is a block diagram of one embodiment of a standalone upgrader module.

FIG. 3 is a block diagram of one embodiment of a standalone upgrader module. The upgrader module (UM) 300 may include a processor 302, a CE device database 304, a memory 306, a web server/client 308, an update logic 310, a CE device interface 320, a network interface 322, a display 330, and a user interface 340. In one embodiment, CE device interface 320 and network interface 322 may be the same interface as indicated by the dashed box.

Because UM 300 is a standalone upgrader module, UM 300 assumes the responsibility for the functions performed by PC 250 discussed above in FIG. 2. In one embodiment, UM 300 includes update logic 310 that is responsible for both installing updates on a CE device, as well as querying CE update servers (not shown) for availability of updates in response to user requests and/or at regularly timed intervals.

In one embodiment, UM 300 includes a web server/client 308 for interfacing with CE update servers. Requests for CE device updates are initiated by web server/client 308, and data received in response to requests are received at web server/client 308. Furthermore, network interface 322 is responsible for communicating with CE update servers over a network, as described in greater detail above.

As discussed above UM 200 illustrated in FIG. 2 and UM 300 illustrated in FIG. 3 are portable and/or handheld devices that may easily be transported to various CE devices. Thus, software updates and the communications protocols needed to install those updates on various CE devices from various manufactures impart the ability to update new types of electronic devices.

Figure 4:
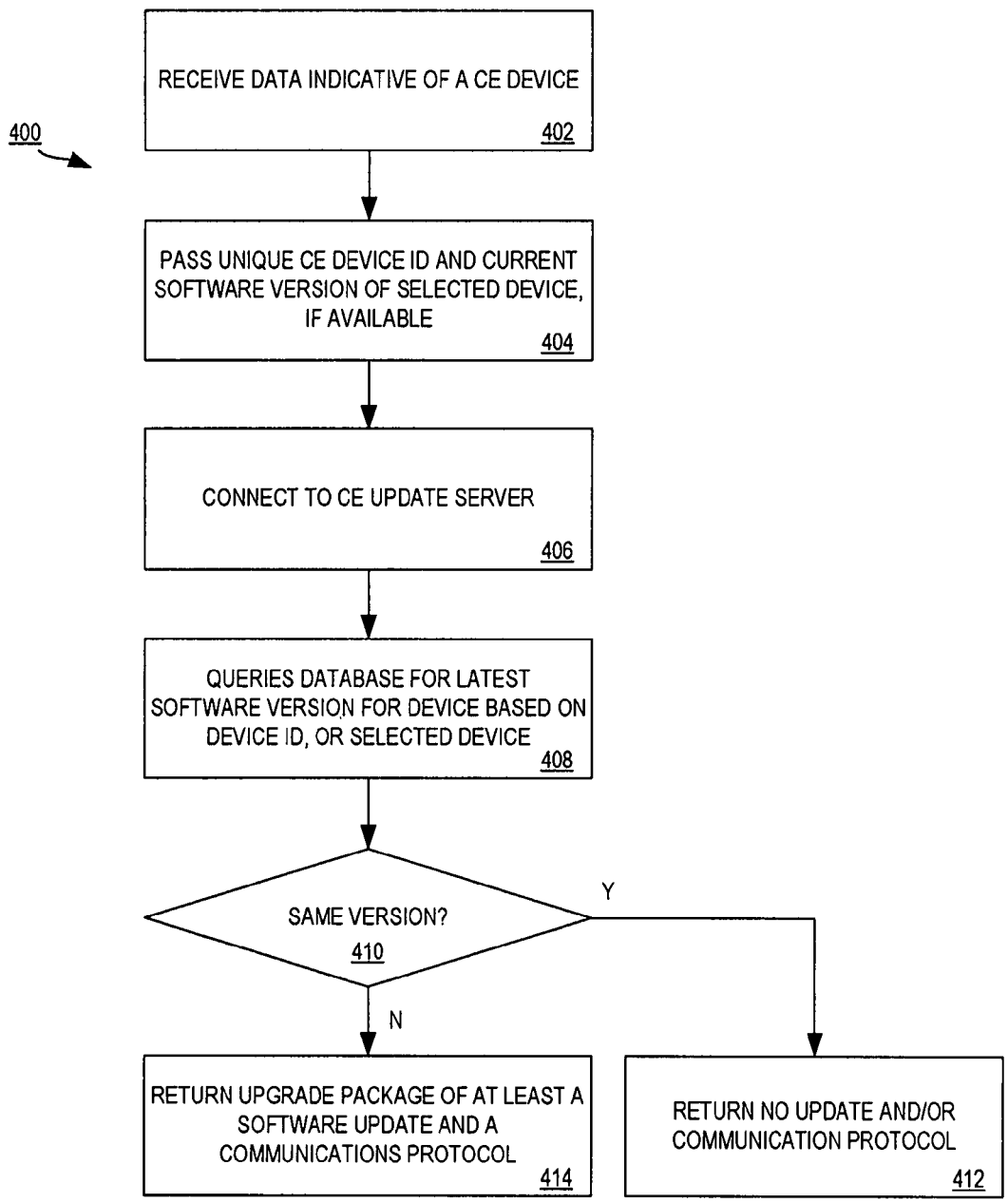
FIG. 4 is a flow diagram of one embodiment of a process for obtaining an update for a consumer electronics device.

FIG. 4 is a flow diagram of one embodiment of a process 400 for obtaining an update for a CE device. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in a UM 200 and PC 250, as discussed above in FIG. 2. In another embodiment, processing logic resides in a standalone UM 300, as discussed above in FIG. 3.

Referring to FIG. 4, process 400 begins with processing logic receiving data indicative of a CE device (processing block 402). In one embodiment, data is received at processing logic through a web user interface, an application interface, etc. In another embodiment, the data may be received from a CE device upon a UM being communicatively coupled with the device. Data indicative of a CE device includes at least device identification data, but may include a serial number, a software version currently running on the device, a model number of the device, etc. Furthermore, additional data such as warranty data may also be received by processing logic.

At processing block 404, processing logic passes the CE device ID and software version currently operating on the CE device, if the software version is available (processing block 404). The CE device ID and software version may be passed from either a standalone UM or a PC, as discussed in greater detail above. Processing logic then connects to a CE update server, such as CE update server 140 of FIG. 1 (processing block 406). In one embodiment, the connection is the result of a redirection from an initial CE update server to a proprietary CE update server.

In one embodiment, at processing block 408, processing logic queries a CE device database for the latest software version for the CE device based on the device ID passed at processing block 404 (processing block 408). In one embodiment, processing logic at a CE update server queries a CE update database for any available updates, software versions, diagnostic tools, warranty information, etc.

In one embodiment, processing logic determines if the software version, which was included in the query, is the same version (i.e., the most current software version for the CE device) stored in the CE update database (processing block 410). If the version is the same, or if no software version was provided by processing logic in the database query, processing logic returns data indicating that no updates are available and/or a communications protocol for the CE device corresponding to the device ID (processing block 412).

However, if the query result is not the same as the software version passed at processing block 404, processing logic returns an upgrade package of at least a software update and a communications protocol for installing the update on a corresponding CE device (processing block 414).

Figure 5:
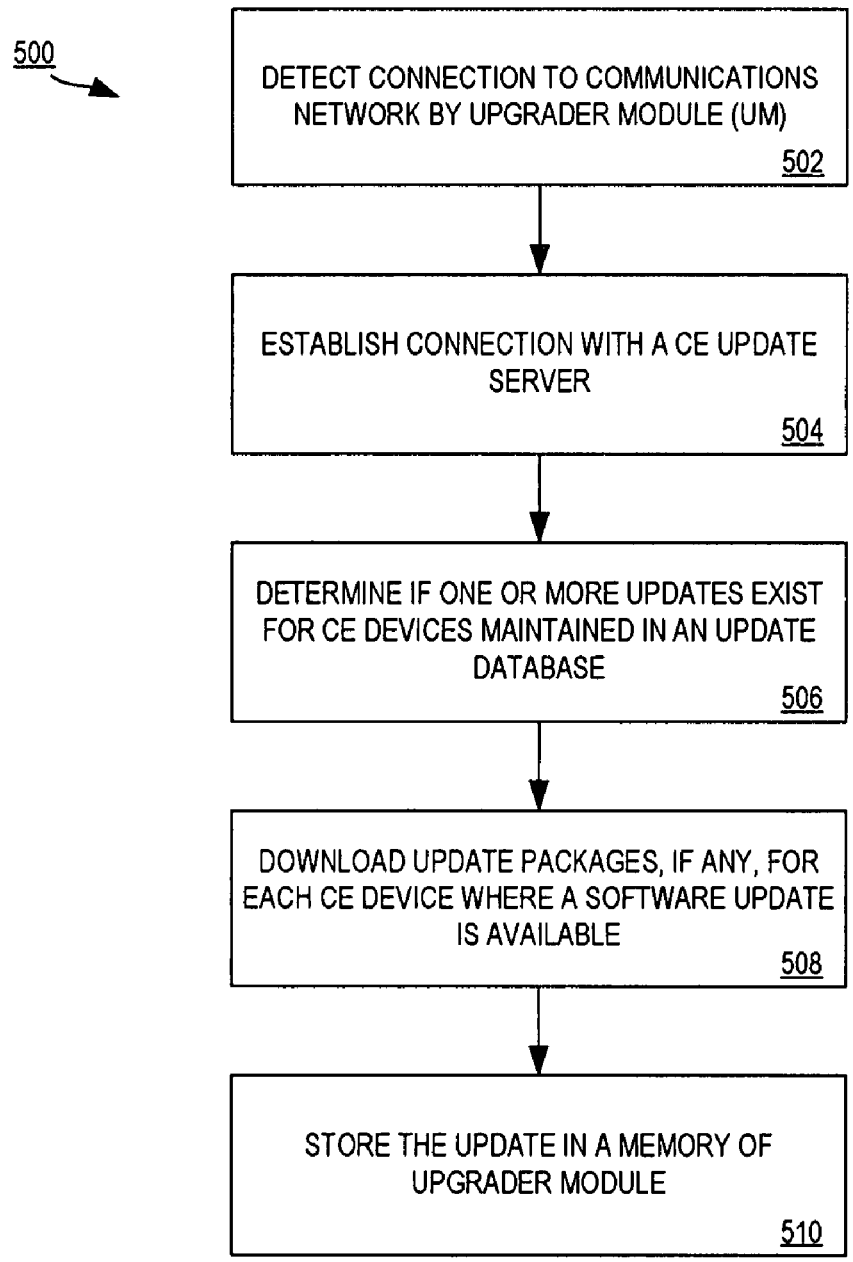
FIG. 5 is a flow diagram of one embodiment of a process for obtaining an update for a consumer electronics device by a standalone upgrader module.

FIG. 5 is a flow diagram of one embodiment of a process 500 for obtaining an update for a CE device by a standalone UM. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in UM 300, as discussed above in FIG. 3.

Referring to FIG. 5, process 500 begins with processing logic detecting a connection to a communications network by an UM (processing block 502). As discussed above with respect to FIG. 3, in one embodiment, a UM includes a network interface for communicating over a public network (e.g., the internet), a private network (e.g., a local area network, a wide area network, etc.), or some combination of both.

After detecting a connection with a communications network, processing logic establishes a connection with a CE update server (processing block 504) over the network. In one embodiment, processing logic directly establishes a connection with a CE update server. In another embodiment, processing logic is redirected to a proprietary CE update server.

At processing block 506, processing logic determines if one or more updates exist for CE devices maintained in an update database (processing block 506). As discussed above, a single UM may provide updates to numerous CE devices. In one embodiment, the CE devices, including identification data and current CE device software version, are maintained in an update database. Therefore, at processing block 506, processing logic determines whether an update exists for each of the devices maintained in the update database.

Processing logic downloads the update packages, if any, for each CE device where a software update is available (processing block 508) and stores the update packages in a memory of an upgrader module (processing block 510). In one embodiment, an update package includes at least a software update and a communications protocol for installing the update on a particular CE device. Because CE device manufacturers commonly have proprietary protocols for updating software, the communications protocol and instructions for installing a software update are included in the update package downloaded and stored by the UM. As a result, a UM with the update package, as described herein, may interface with, and install, software updates on CE devices even when such devices include proprietary software systems.

Figure 6:
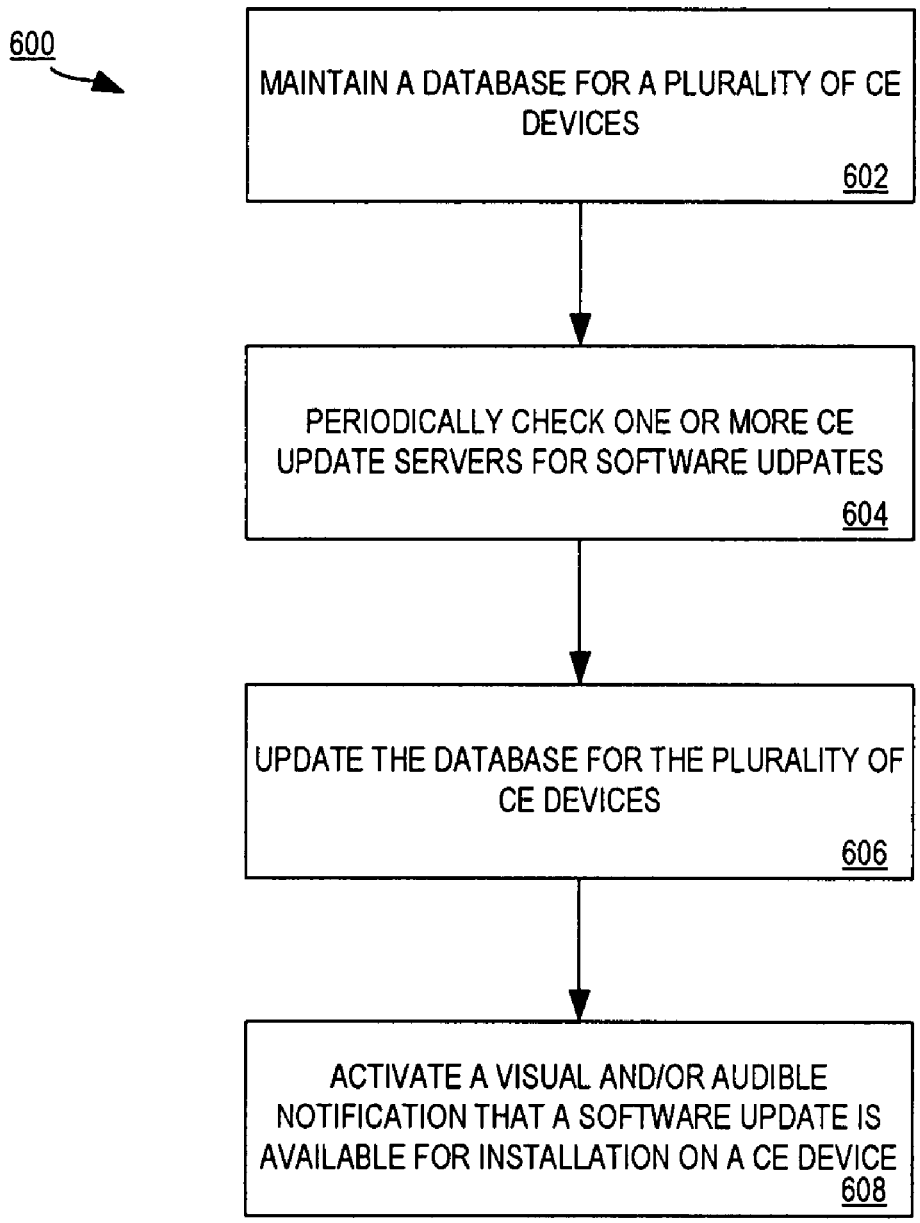
FIG. 6 is a flow diagram of one embodiment of a process for maintaining a consumer electronics device database.

FIG. 6 is a flow diagram of one embodiment of a process 600 for maintaining a consumer electronics device database. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in PC 250 as discussed above in FIG. 2, or UM 300, as discussed above in FIG. 3.

Referring to FIG. 6, process 600 begins with processing logic maintaining a database for a plurality of CE devices (processing block 602). As discussed above, in one embodiment, a CE device database stores device identification data, device serial numbers, software versions, warranty information, etc. for each device with an entry in the database, and serviced by an upgrader module.

At processing block 604, processing logic periodically checks one or more CE update servers for software updates (processing block 604). In one embodiment processing logic may be preconfigured to check CE update servers at a specific time interval (e.g., daily, weekly, monthly, etc.). Furthermore, processing logic may check at a specified or preferred time interval.

Processing logic updates the CE product database for the plurality of devices, based on the results of processing block 604 (processing block 606). In one embodiment, when a new version of software, a software patch, a diagnostic operation, etc. is found and download, as discussed above in FIGS. 4 and 5, the database is updated to reflect that new information, software, diagnostics, etc. are available for each CE device.

Based on the status of the updates to the CE device database, a visual and/or audible notification that an update is available for a CE device is activated (processing logic 608). In one embodiment, a PC displays a visual and/or audible indication that the PC has received an update. In another embodiment, a notification is activated on a UM. Furthermore, the visual and/or audible notification may be included in a display indicating which particular device has an update available. For example, processing logic may display a visual indication that CE device 4 from CE devices 1 . . . N has an update available. In an embodiment where a PC maintains a CE device database, the processing logic of the PC may activate the notifications to alert a user to connect a UM to the PC, so the software can be transferred to the UM for upgrading the appropriate device(s).

Figure 7:
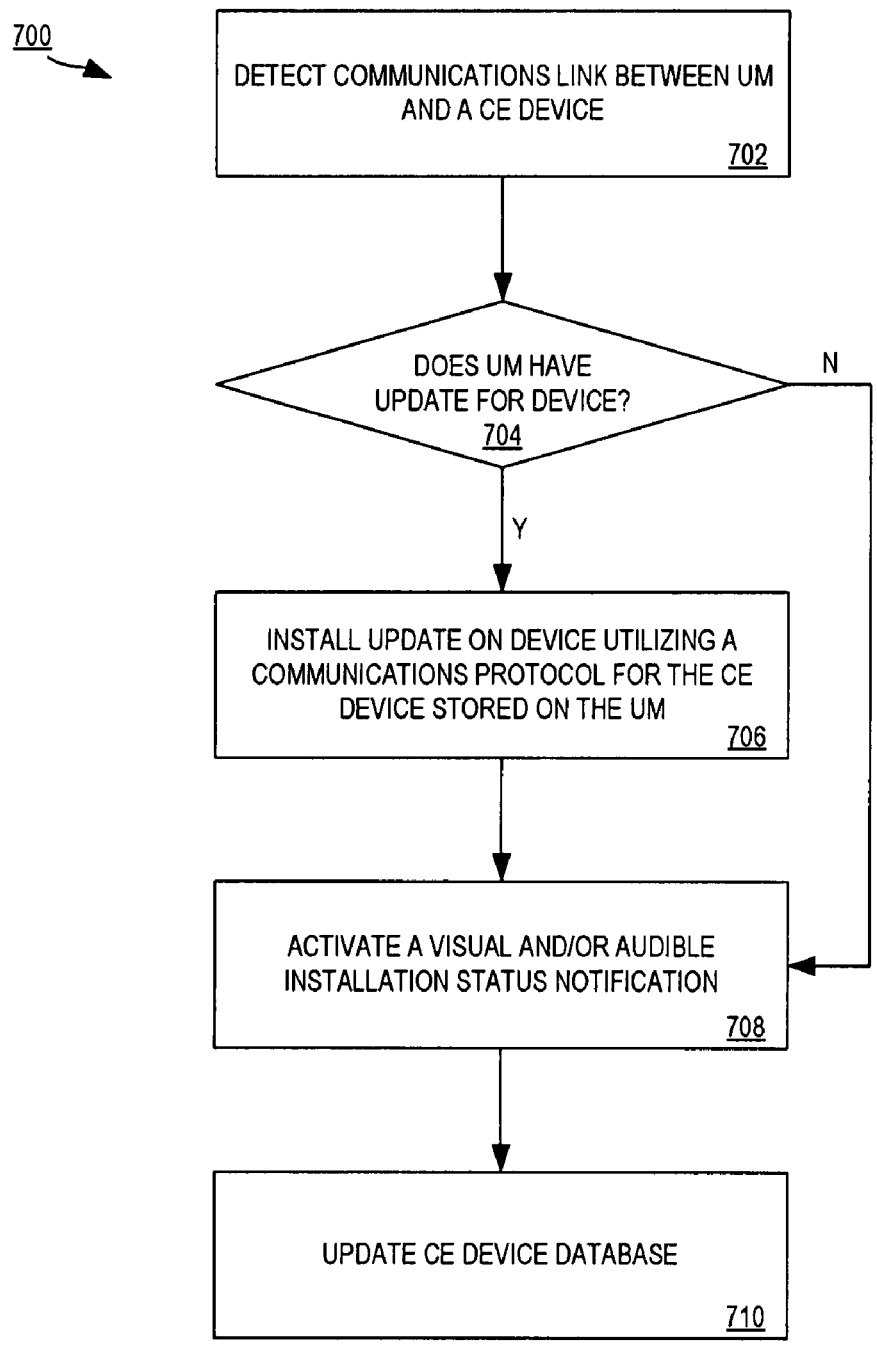
FIG. 7 is a flow diagram of one embodiment of a process for installing an update on a consumer electronics device.

FIG. 7 is a flow diagram of one embodiment of a process 700 for installing an update on a CE device. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in UM 200 as discussed above in FIG. 2, or UM 300, as discussed above in FIG. 3.

Referring to FIG. 7, process 700 begins with processing logic detecting a communications link between a UM and a consumer electronics device (processing block 702). As discussed above, a communications link between a UM and CE device may be established by coupling the devices via a USB cable.

At processing block 704, processing logic determines if an update for the CE device is available on the UM (processing block 704).

If, at processing block 704, processing logic determines that an update is not available for the CE device, a visual and/or audible status notification is activated (processing block 708). For example, a LED of a predefined color (such as a yellow LED) that indicates no update is available may be activated by processing logic on the UM. In one embodiment, a user interface of the UM indicates that no update is available for the particular device.

However, if processing logic determines that an update is available for the CE device, processing logic installs the update on the device utilizing the communications protocol for the CE device as stored on the UM (processing block 706). After processing logic finishes the installation attempt, processing logic activates a visual and/or audible status notification (processing block 708). In one embodiment, the notification consists of activating an LED. In other embodiment, a display of the UM indicates the status of success or failure of the installation, as well as other metrics concerning the installation, such as whether or not a diagnostic should be run, whether the CE device should be registered with the manufacturer, whether the manufacturer has initiated a part or product recall impacting the CE device, etc.

Processing logic then updates a CE device database (processing block 710). In one embodiment, the database is updated to reflect the most current version of an installed software package operating on a CE device.

Figure 8:
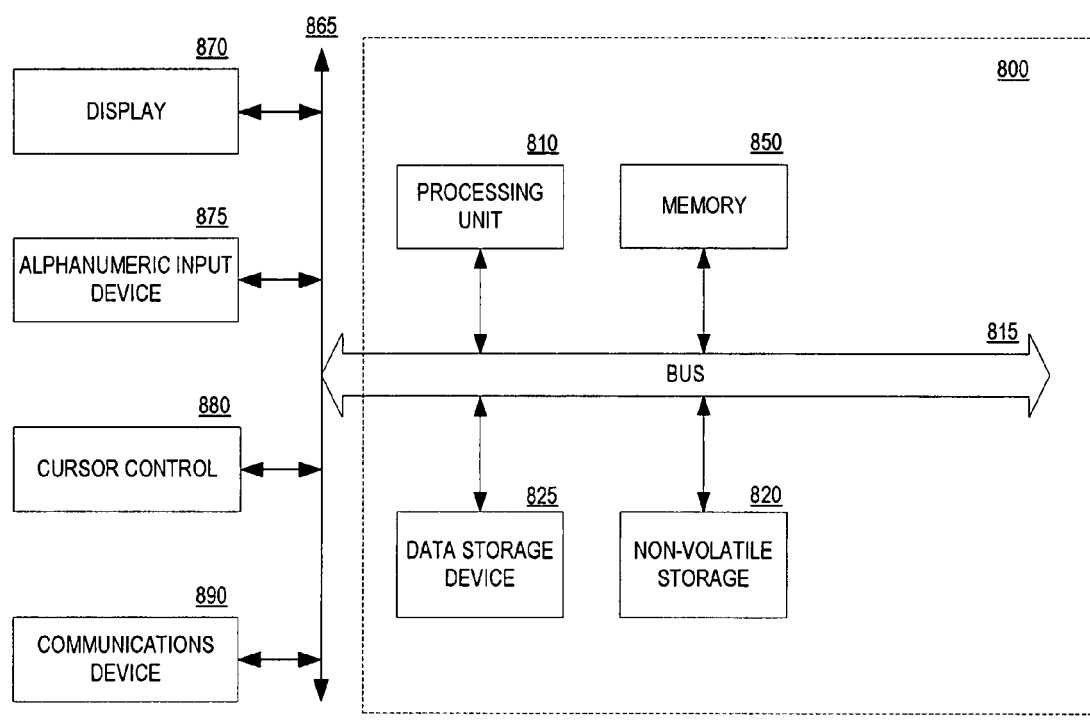
FIG. 8 illustrates one embodiment of a computer system in which embodiments of the present invention may operate.

FIG. 8 is one embodiment of a computer system, within which a set of instructions, for causing the machine to perform any one of the methodologies discussed above, may be implemented. It will be apparent to those of ordinary skill in the art, however, that other alternative systems of various architectures may also be used. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a cathode ray tube (CRT) or a liquid crystal display (LCD) coupled to bus 865 through bus 815 for displaying information to a computer user. An alphanumeric input device 875, including alphanumeric and other keys, may also be coupled to bus 865 through bus 815 for communicating information and command selections to processor 810. An additional user input device is cursor control device 880, such as a mouse, a trackball, stylus, or cursor direction keys coupled to bus 865 through bus 815 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments of the present invention.

It will be appreciated by those of ordinary skill in the art that any configuration of the system may be used for various purposes according to the particular implementation. The control logic or software implementing the present invention can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The present invention may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 810. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    querying a consumer electronics (CE) device, by a portable device, for at least identification data of the CE device and a current software version for software operating on the CE device;
    storing the identification data and the current software version in a memory of the portable device;
    obtaining an update package at the portable device, the update package including at least a software update for the (CE) device with a proprietary software system, instructions to the portable device for installation of the software update on the CE device based on one or more requirements of the proprietary software system, and a communications protocol supported by the proprietary software system of the CE device to be utilized by the portable device for installing the software update on the CE device, wherein the obtaining further comprises
        in response to the portable device detecting a connection to a communications network, establishing a connection between the portable device and a CE upgrade server over the communications network,
        querying the CE upgrade server, by the portable device, to determine if a software update is available for the CE device based on the identification data stored in the memory of the portable device,
        receiving, at the portable device, verification data and a redirection from the CE upgrade server to request the software update from a proprietary CE upgrade server,
        requesting, by the portable device, the software update from the proprietary CE upgrade server, the request accompanied by the verification data to indicate to the proprietary CE upgrade server that the request is authorized by the CE upgrade server,
        downloading, from the proprietary CE upgrade server, the software update, if an update is available, the instructions, and the communications protocol for installing the software update, and
        storing the software update and the communications protocol in the memory of the portable device; and
    in response to the portable device detecting a communications link between the portable device and the CE device, the portable device installing the software update on the CE device based on the instructions and utilizing the communications protocol.

2. The method of claim 1, further comprising:
    activating at least one of visual or audible notification that a software update is available and stored in the memory of the portable device.

3. The method of claim 1, further comprising:
    activating at least one of a visual or audible notification of a status of the software update installation.

4. The method of claim 1, further comprising:
    maintaining a database for a plurality of CE devices that stores identification data and a corresponding current software version for each of the plurality of CE devices; and
    periodically checking a CE upgrade server for an availability of a software update for each of the plurality of CE devices in the database; and
    downloading a software update for each of the plurality of CE devices when a software update for the corresponding CE device is available.

5. The method of claim 4, wherein the database is maintained by the portable device.

6. The method of claim 4, wherein the databases is maintained by a computer system.

7. The method of claim 6, further comprising:
    in response to the computer system detecting a communications link with the portable device, supplying the software updates to the portable device.

8. The method of claim 4, wherein the software update and communications protocol are obtained from a CE upgrade server over a communications network.

9. A non-transitory machine-readable storage medium having executable code stored thereon to cause a machine to perform a method, the method comprising:
    querying a consumer electronics (CE) device by a portable device for at least identification data of the CE device and a current software version for software operating on the CE device;
    storing the identification data and the current software version in a memory of the portable device;
    obtaining an update package at the portable device, the update package including at least a software update for the CE device with a proprietary software system, instructions to the portable device for installation of the software update on the CE device based on one or more requirements of the proprietary software system, and a communications protocol supported by the proprietary software system of the CE device to be utilized by the portable device for installing the software update on the CE device, wherein the obtaining further comprises
        in response to the portable device detecting a connection to a communications network, establishing a connection between the portable device and a CE upgrade server over the communications network,
        querying the CE upgrade server, by the portable device, to determine if a software update is available for the CE device based on the identification data stored in the memory of the portable device,
        receiving at the portable device verification data and a redirection from the CE upgrade server to request the software update from a proprietary CE upgrade server,
        requesting by the portable device the software update from the proprietary CE upgrade server, the request accompanied by the verification data to indicate to the proprietary CE upgrade server that the request is authorized by the CE upgrade server,
        downloading from the proprietary CE upgrade server, the software update, if an update is available, the instructions, and the communications protocol for installing the software update, and
        storing the software update and the communications protocol in the memory of the portable device; and
    in response to a portable device detecting a communications link with the CE device, the portable device installing the software update on the CE device based on the instructions and utilizing the communications protocol.

10. The machine readable storage medium of claim 9, further comprising:

activating at least one of visual or audible notification that a software update is available and stored in the memory of the portable device.

11. The machine readable storage medium of claim 9, further comprising:
activating at least one of a visual or audible notification of a status of the software update installation.

12. The machine readable storage medium of claim 9, further comprising:
maintaining a database for a plurality of CE devices that stores identification data and a corresponding current software version for each of the plurality of CE devices; and
periodically checking a CE upgrade server for an availability of a software update for each of the plurality of CE devices in the database; and
downloading a software update for each of the plurality of CE devices when a software update for the corresponding CE device is available.

13. The machine readable storage medium of claim 12, wherein the database is maintained by the portable device.

14. The machine readable storage medium of claim 12, wherein the database is maintained by a computer system.

15. The machine readable storage medium of claim 14, further comprising:
in response to the computer system detecting a communications link with the portable device, supplying the software updates to the portable device.

16. The machine readable storage medium of claim 12, wherein the software update and communications protocol are obtained from a CE upgrade server over a communications network.

17. A system, comprising:
a consumer electronics (CE) update server to maintain a database of software program updates and corresponding communications protocols for a plurality of CE devices; and
a portable device to
query the CE device for at least identification data of the CE device and a current software version for software operating on the CE device, and store the identification data and the current software version in a memory of the portable device,
obtain an update package at the portable device that includes at least a software update for the CE device with a proprietary software system, instructions of the portable device for installation of the software update on the CE device based on one or more requirements of the proprietary software system, and a communications protocol supported by the proprietary software system of the CE device to be utilized by the portable device for installation of the software update on the CE device, wherein the portable device to obtain the update package further comprises the portable device to
establish a connection between the portable device and the CE update server over a communications network in response to the portable device's detection of a connection to the communications network transmit the identification data for the CE device to the CE update server, receive verification data and a redirection from the CE update server to request the software update from a proprietary CE upgrade server, request the software update from the proprietary CE upgrade server, the request accompanied by the verification data to indicate to the proprietary CE upgrade server that the request is authorized by the CE update server,
download, from the proprietary CE upgrade server, the software update, if an update is available, the instructions, and the communications protocol for installing the software update, and store the software update and the communications protocol in the memory of the portable device, and
in response to detection of a communications link between the portable device and the CE device, the portable device to install the software update on the CE device based on the instructions and utilizing the communications protocol.

18. The system of claim 17, further comprising:
the portable device to maintain a database for a plurality of CE devices that stores identification data and a corresponding current software version for each of the plurality of CE devices, periodically check a CE upgrade server for availability of an update for each of the plurality of CE devices in the database, and download a software update for each of the plurality of CE devices when a software update for the corresponding CE device is available.

19. An apparatus comprising:
means for querying a consumer electronics (CE) device, by a portable device, for at least identification data of the CE device and a current software version for software operating on the CE device;
means for storing the identification data and the current software version in a memory of the portable device;
means for obtaining an update package at the portable device, the updated package including at least a software update for the CE device with a proprietary software system, instructions to the portable device for installation of the software update on the CE device based on one or more requirements of the proprietary software system, and a communications protocol supported by the proprietary software system of the CE device to be utilized by the portable device for installing the software update on the CE device, wherein the means for obtaining further comprises
in response to the portable device detecting a connection to a communications network, means for establishing a connection between the portable device and a CE upgrade server over the communications network,
means for querying the CE upgrade server, by the portable device to determine if a software update is available for the CE device based on the identification data stored in the memory of the portable device,
means for receiving, at the portable device, verification data and a redirection from the CE upgrade server to request the software update from a proprietary CE upgrade server,
means for requesting, by the portable device, the software update from the proprietary CE upgrade server, the request accompanied by the verification data to indicate to the proprietary CE upgrade server that the request is authorized by the CE upgrade server,
means for downloading, from the proprietary CE upgrade server, the software update, if an update is available, the instructions, and the communications protocol for installing the software update, and
means for storing the software update and the communications protocol in the memory of the portable device; and
means for the portable device installing the software update on the CE device based on the instructions and utilizing the communications protocol in response to the portable device detecting a communication link between the portable device and the CE device.

20. The apparatus of claim 19, further comprising:

means for maintaining a database for a plurality of CE devices that stores identification data and a corresponding current software version for each of the plurality of CE devices; and means for periodically checking a CE upgrade server for an availability of a software update for each of the plurality of CE devices in the database; and means for downloading a software update for each of the plurality of CE devices when a software update for the corresponding CE device is available.

* * * * *